US010412641B2

(12) United States Patent
Ehrlich et al.

(10) Patent No.: US 10,412,641 B2
(45) Date of Patent: *Sep. 10, 2019

(54) ANOMALY CORRELATION MECHANISM FOR ANALYSIS OF HANDOVERS IN A COMMUNICATION NETWORK

(71) Applicant: AT&T Intellectual Property I, L.P., Atlanta, GA (US)

(72) Inventors: Willa Kay Ehrlich, Highland Park, NJ (US); Zhi Cui, Sugar Hill, GA (US); Duc Phan, Renton, WA (US); Marcus Wright, Edmonds, WA (US); Qinggang Zhou, Marietta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/893,563

(22) Filed: Feb. 9, 2018

(65) Prior Publication Data
US 2018/0167855 A1 Jun. 14, 2018

Related U.S. Application Data

(63) Continuation of application No. 14/090,168, filed on Nov. 26, 2013, now Pat. No. 9,918,258.

(51) Int. Cl.
H04W 36/00 (2009.01)
H04W 24/02 (2009.01)

(52) U.S. Cl.
CPC ....... H04W 36/0083 (2013.01); H04W 24/02 (2013.01); H04W 36/00835 (2018.08); H04W 36/0079 (2018.08)

(58) Field of Classification Search
CPC .......... H04W 24/02; H04W 36/0083; H04W 36/0094; H04W 36/165; H04W 36/00;
(Continued)

(56) References Cited

U.S. PATENT DOCUMENTS 8,208,924 B2 6/2012 Han et al.
8,301,184 B2 10/2012 Byun et al.
(Continued)

FOREIGN PATENT DOCUMENTS

CA 2793193 4/2013
EP 2258127 12/2010
(Continued)

OTHER PUBLICATIONS

Engels, et al., "Autonomous Self-Optimization of Coverage and Capacity in LTE Cellular Networks," Vehicular Technology, IEEE Transactions on, vol. 62, Issue 5, Jun. 2013), Abstract. <http://ieeexplore.ieee.org/xpl/articleDetails.jsp?arnumber=6492108>. Retrieved on Sep. 17, 2013, 2 pages.
(Continued)

Primary Examiner — Quoc Thai N Vu
(74) Attorney, Agent, or Firm — Amin, Turocy & Watson, LLP

(57) ABSTRACT

Optimizing neighbor cell relationships for improving handover performance by interpreting handover failures is presented herein. A method can include receiving data representing a time series of failures of outgoing handovers corresponding to a wireless access point device, and determining, based on a determined condition corresponding to a metric, that a source cell of the wireless access point device is associated with an anomalous cell relation corresponding to the time series of the failures of the outgoing handovers in response to quantifying the time series based on the metric. In various examples, the quantifying can include quantifying the time series with respect to: a volume of the failures during a period of time, an entropy calculated on a probability distribution of the failures by determined relations between the source cell and target cells, and/or an entropy calculated on a probability distribution of determined outgoing handover outcomes.

20 Claims, 11 Drawing Sheets

(58) Field of Classification Search
CPC ............ H04W 36/0005; H04W 36/08; H04W 36/245; H04W 84/18; H04W 36/0079; H04W 36/00835; H04L 1/0019; H04L 43/0823; H04L 43/16

See application file for complete search history.

(56) References Cited

U.S. PATENT DOCUMENTS

| | | | |
|---|---|---|---|
| 8,305,987 | B2 | 11/2012 | Fong et al. |
| 2009/0264130 | A1* | 10/2009 | Catovic ............ H04W 36/0083 455/436 |
| 2010/0322227 | A1 | 12/2010 | Luo |
| 2010/0325267 | A1 | 12/2010 | Mishra et al. |
| 2011/0028144 | A1 | 2/2011 | Catovic et al. |
| 2011/0207452 | A1 | 8/2011 | Grob-Lipski et al. |
| 2011/0256833 | A1 | 10/2011 | Racz et al. |
| 2012/0028676 | A1 | 2/2012 | He |
| 2012/0094672 | A1 | 4/2012 | Hunukumbure et al. |
| 2012/0100852 | A1 | 4/2012 | Horn |
| 2012/0106370 | A1 | 5/2012 | Radulescu et al. |
| 2012/0178451 | A1 | 7/2012 | Kubota et al. |
| 2012/0213057 | A1 | 8/2012 | Zhang et al. |
| 2012/0252440 | A1* | 10/2012 | Watanabe ............ H04W 24/02 455/423 |
| 2012/0275315 | A1 | 11/2012 | Schlangen et al. |
| 2012/0276900 | A1 | 11/2012 | Stephens et al. |
| 2012/0307750 | A1 | 12/2012 | Kunukumbure et al. |
| 2013/0150056 | A1 | 6/2013 | Yi et al. |
| 2013/0190006 | A1 | 7/2013 | Kazmi et al. |
| 2013/0225156 | A1 | 8/2013 | Yuan et al. |
| 2015/0281040 | A1* | 10/2015 | Yamine ................. H04W 24/02 455/436 |

FOREIGN PATENT DOCUMENTS

| | | |
|---|---|---|
| EP | 2629565 | 4/2012 |
| WO | 2012136261 | 10/2012 |
| WO | 2012143055 | 10/2012 |
| WO | 2013070166 | 5/2013 |
| WO | 2013084720 | 6/2013 |
| WO | 2013120517 | 8/2013 |

OTHER PUBLICATIONS

Office Action for U.S. Appl. No. 14/090,168 dated Jun. 29, 2016, 7 pages.

Final Office Action for U.S. Appl. No. 14/090,168 dated Jan. 6, 2017, 13 pages.

Office Action for U.S. Appl. No. 14/090,168 dated Jun. 1, 2017, 6 pages.

* cited by examiner

ANOMALY CORRELATION MECHANISM FOR ANALYSIS OF HANDOVERS IN A COMMUNICATION NETWORK

RELATED APPLICATION

The subject patent application is a continuation of, and claims priority to, U.S. patent application Ser. No. 14/090,168 (now U.S. Pat. No. 9,918,258), filed Nov. 26, 2013, and entitled "ANOMALY CORRELATION MECHANISM FOR ANALYSIS OF HANDOVERS IN A COMMUNICATION NETWORK," the entirety of which application is hereby incorporated by reference herein.

BACKGROUND

Self organizing network (SON) based technologies, including automatic neighbor relation (ANR) functions, are designed to improve management and optimization of mobile wireless networks. Such functions include automatically adding/removing entries to/from neighbor relation tables (NRTs) that specify neighbor cell relationships for handovers. However, identification, analysis, and interpretation of handover failures has been challenging due to: changing network conditions with respect to the addition of new cell sites; seasonality effects with respect to time of day and/or day of week in long term evolution (LTE) wireless communications; and difficulty in identifying root cause(s) of excessive handover failures with respect to radio frequency (RF) environment conditions, lack of resources within source and/or target LTE evolved node Bs (eNodeBs). Consequently, identification of root cause(s) of handover failures has had some drawbacks with respect to optimizing neighbor cell relationships for improving handover performance.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
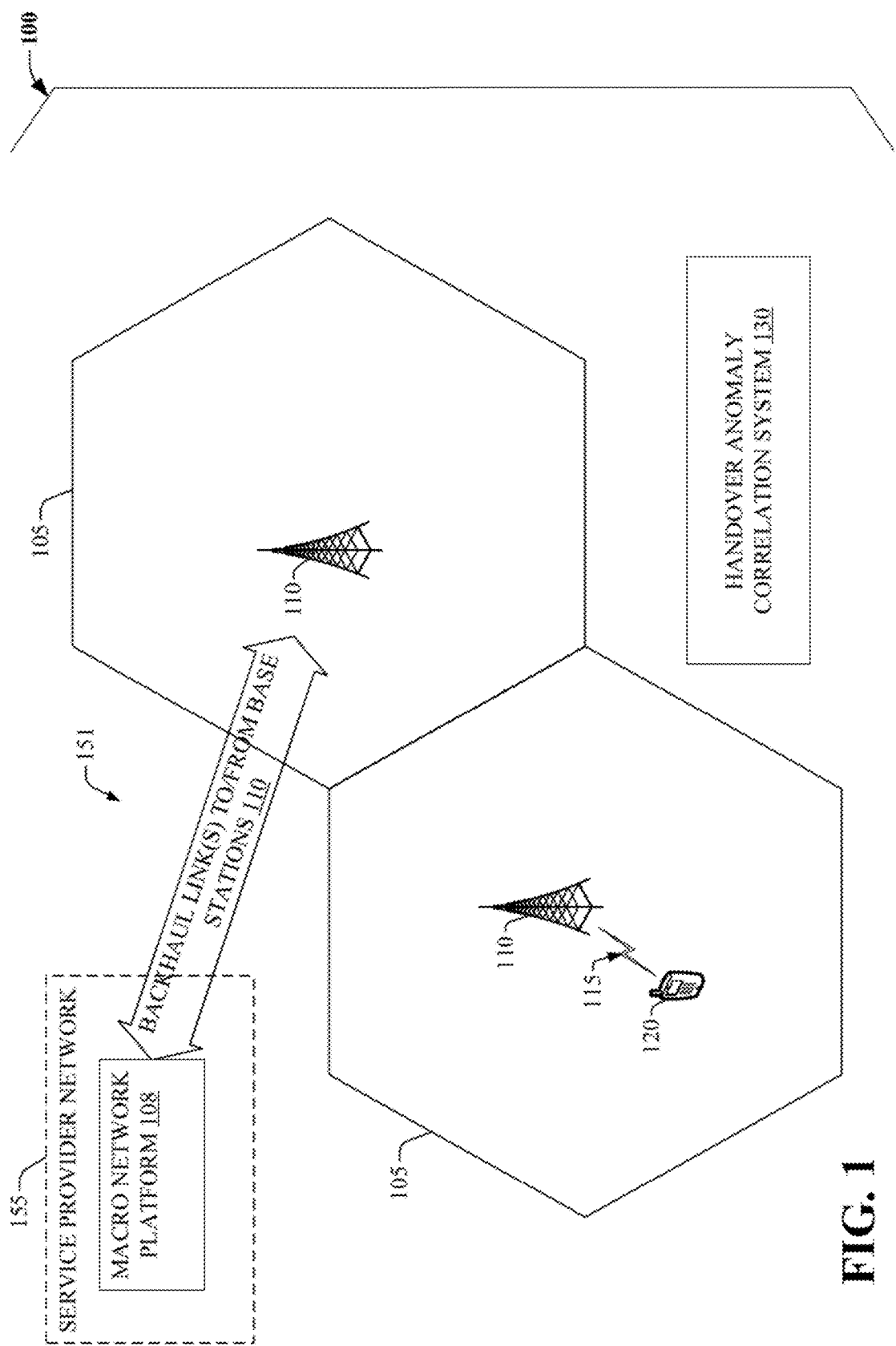
FIG. 1 illustrates a wireless network environment, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

In a SON based LTE based mobile wireless network, performance measurements made by a mobile handset (UE) and an evolved node B (eNodeB) are utilized to automatically add/remove entries to/from neighbor relations tables (NRTs), e.g., data structures within component(s) of an eNodeB that specify neighboring cells for intra-LTE or non-LTE handovers, for facilitation of such handovers. However, identification, analysis, and interpretation of handover failures, e.g., with respect to an eNodeB, an evolved universal terrestrial radio access network (EUTRAN) source cell of an eNodeB, etc. has been challenging due to: changing network conditions with respect to the addition of new cell sites; seasonality effects with respect to time of day and/or day of week in long term evolution (LTE) wireless communications; and difficulty in identifying root cause(s) of excessive handover failures with respect to radio frequency (RF) environment conditions, lack of resources within source and/or target LTE evolved node Bs (eNodeBs).

Various embodiments disclosed herein can optimize handover performance and improve wireless customer experiences by interpreting handover failures involving LTE eNodeBs. In this regard, such embodiments can extend current SON capabilities by identifying "heavy-hitter" neighbor cell relation(s), e.g., neighbor cell relation(s) that dominate SON handover failures associated with an eNodeB, e.g., with respect to a total number of handover failures associated with a EUTRAN cell of an eNodeB, with respect to a total number of handover failures associated with the eNodeB, etc., and direct ANR function(s) to remove the heavy-hitter cell relations from respective NRTs.

In one embodiment, a method can receive, by a system comprising a processor, data representing a daily, hourly, etc. time series of failures of outgoing handovers corresponding to a wireless access point device, e.g., an eNodeB, etc.—the outgoing handovers are outbound communication transfers from a source cell, EUTRAN cell, etc. of the eNodeB to target cells, EUTRAN cells, etc., for example, within the eNodeB, of a neighboring eNodeB, etc.

In an embodiment, the method can quantify the time series based on a volume metric corresponding to the daily, hourly, etc. time series of the failures of the outgoing handovers, e.g., with respect to a total number of outgoing handover failures of EUTRAN cells of the eNodeB that occur during a determined period of time, e.g., day, week, etc.

In another embodiment, the method can quantify the time series based on a standardized entropy metric corresponding to a standardized entropy calculated on a probability distribution of the failures of the outgoing handovers by determined relations between the source cell and the target cells, e.g., by a given EUTRAN cell neighboring cell relation.

In yet another embodiment, the method can quantify the time series based on a standardized entropy metric corresponding to a standardized entropy calculated on a probability distribution of determined outgoing handover outcomes, dispositions, etc., e.g., pass/fail.

In an embodiment, the method can generate, by the system based on the data, the daily, hourly, etc. time series of failures of the outgoing handovers, and analyze such time series with respect to weekly/daily periodicity, e.g., with respect to daily/hourly variation of outgoing handover failures within a week/day.

In one embodiment, the method can generate, by the system based on the data, a daily, hourly, etc. time series associated with the standardized entropy metric corresponding to the standardized entropy calculated on the probability distribution of the failures of the outgoing handovers by given EUTRAN cell neighboring cell relation, and analyze such time series with respect to weekly/daily periodicity, e.g., with respect to a daily/hourly variation of such standardized entropy metric within a week/day.

In yet another embodiment, method can generate, by the system based on the data, a daily, hourly, etc. time series of the standardized entropy metric corresponding to the standardized entropy calculated on the probability distribution of determined outgoing handover outcomes, and analyze such time series with respect to weekly/daily periodicity, e.g., with respect to a daily/hourly variation of such standardized entropy metric within a week/day.

In one embodiment, the method can generate, by the system based a determined condition corresponding to the volume metric, the standardized entropy metric corresponding to the standardized entropy calculated on the probability distribution of the failures of the outgoing handovers by given EUTRAN cell neighboring cell relation, and/or the standardized entropy metric corresponding to the standardized entropy calculated on the probability distribution of determined outgoing handover outcomes, an outgoing handover "threshold crossing alert" representing an existence of anomalous cell relation(s) corresponding to the time series of the failures of the outgoing handovers.

In another embodiment, the method can generate, by the system, the outgoing handover threshold-crossing alert using a seasonal decomposition of the daily, hourly, etc. time series of failures of the outgoing handovers, of the standardized entropy metric(s) discussed above, etc. using local regression (LOESS) smoothing procedures. For example, the system can generate the threshold-crossing alert based on detected upward and/or downward spikes in data generated by the LOESS smoothing procedures.

In an embodiment, based on generation of the outgoing handover threshold crossing alert, the method can send a message directed to service personal, technician(s), etc., e.g., alerting the service personal, technician(s), etc. to perform root cause analysis of the anomalous cell relation(s), e.g., to analyze determined performance metrics corresponding to the source cell. In another embodiment, the method can analyze, by the system based on the outgoing handover threshold crossing alert, the performance metrics, e.g., determining whether there is a problem with a cell site backhaul transport, etc. of an associated network, determining whether maintenance was performed, recently performed, etc. on a set of eNodeBs corresponding to the source cell, etc.

In yet another embodiment, in response to determining that the outgoing handover threshold crossing alert was generated based on the determined condition corresponding to the standardized entropy calculated on the probability distribution of the failures of the outgoing handovers by given EUTRAN cell relation, the method can identify, by the system, a dominant cell relation, e.g., a "heavy-hitter" neighbor cell relation, of the anomalous cell relation(s) that is dominating SON handover failures with respect to the total number of failures of outgoing handovers corresponding to a source eNodeB, e.g., with respect to a total number of handover failures associated with a EUTRAN cell of the source eNodeB, etc.

In one embodiment, the method can determine, identify, etc., by the system, the heavy-hitter neighbor cell relation by employing entropy based clustering. In another embodiment, the method can determine, identify, etc., by the system, the heavy-hitter neighbor cell relation by employing a non-parametric outlier detection technique.

In an embodiment, in response to identifying the heavy-hitter neighbor cell relation, the method can receive, by the system, incoming handover data representing a daily, hourly, etc. time series of failures of incoming handovers corresponding to a target wireless access point device, target eNodeB, etc. including the target cell—the heavy-hitter neighbor cell relation including the source cell and the target cell, and the incoming handovers are incoming, inbound, etc. communication transfers from source cells including the source cell to the target cell.

In one embodiment, the method can quantify the time series based on an incoming handover volume metric corresponding to the daily, hourly, etc. time series of the failures of the incoming handovers, e.g., with respect to a total number of incoming handover failures of EUTRAN cells of the target eNodeB that occur during a determined period of time, e.g., day, week, etc.

In another embodiment, the method can quantify the time series based on an incoming handover standardized entropy metric corresponding to a standardized entropy calculated on a probability distribution of the failures of the incoming handovers by determined relations between the target cell and the source cells, e.g., by a given EUTRAN cell neighboring cell relation.

In yet another embodiment, the method can quantify the time series based on an incoming handover standardized entropy metric corresponding to a standardized entropy calculated on a probability distribution of determined incoming handover outcomes, dispositions, etc., e.g., pass/fail.

In an embodiment, the method can generate, by the system based on the incoming handover data, the daily, hourly, etc. time series of failures of the incoming handovers, and analyze such time series with respect to weekly/daily periodicity, e.g., with respect to daily/hourly variation of incoming handover failures within a week/day.

In one embodiment, the method can generate, by the system based on the incoming handover data, a daily, hourly, etc. time series associated with the incoming handover standardized entropy metric corresponding to the standardized entropy calculated on the probability distribution of the failures of the incoming handovers by given EUTRAN cell neighboring cell relation, and analyze such time series with respect to weekly/daily periodicity, e.g., with respect to a daily/hourly variation of such standardized entropy metric within a week/day.

In yet another embodiment, method can generate, by the system based on the incoming handover data, a daily, hourly, etc. time series of the incoming handover standardized entropy metric corresponding to the standardized entropy calculated on the probability distribution of determined incoming handover outcomes, and analyze such time series with respect to weekly/daily periodicity, e.g., with respect to a daily/hourly variation of such standardized entropy metric within a week/day.

In one embodiment, the method can generate, by the system based a determined condition corresponding to the incoming handover volume metric, the incoming handover standardized entropy metric corresponding to the standardized entropy calculated on the probability distribution of the failures of the incoming handovers by given EUTRAN cell neighboring cell relation, and/or the incoming handover standardized entropy metric corresponding to the standardized entropy calculated on the probability distribution of determined incoming handover outcomes, an incoming handover threshold crossing alert representing an existence of an anomalous cell relation(s) corresponding to the time series of the failures of the incoming handovers.

In an embodiment, in response to generating the incoming handover threshold crossing alert, the method can correlate, by the system, outgoing handover threshold crossing alert(s) corresponding to the source cell, source eNodeB, source EUTRAN cell, etc. with incoming handover threshold crossing alert(s) corresponding to the target cell, target eNodeB, target EUTRAN cell, etc. with respect to a time period. For example, the method can determine whether all incoming handovers fail at the target eNodeB; whether all incoming handovers fail at the target EUTRAN cell during a time corresponding to an outgoing handover threshold crossing alert corresponding to the source cell, source eNodeB, source EUTRAN cell, etc.; whether all incoming handovers from a source EUTRAN cell fail; and/or whether all incoming handovers from the source EUTRAN cell to the target EUTRAN cell fail.

In another embodiment, in response to correlating the outgoing handover threshold crossing alert(s) with the incoming handover threshold crossing alert(s), the method can send, by the system, a message directed to service personal, technician(s), etc., e.g., alerting the service personal, technician(s), etc. to analyze determined performance metrics corresponding to the target cell, target eNodeB, target EUTRAN cell, etc, e.g., for performing a root cause analysis of the anomalous cell relation(s) corresponding to the source cell and the target cell.

In another embodiment, in response to correlating the outgoing handover threshold crossing alert(s) with the incoming handover threshold crossing alert(s), the method can analyze, by the system, the performance metrics corresponding to the target cell, target eNodeB, target EUTRAN cell, etc., e.g., determining whether there is a problem with the target cell, a cell site backhaul transport, etc. of an associated network, determining whether maintenance was performed, recently performed, etc. on a set of eNodeBs corresponding to the target cell, etc.

Another embodiment can include a system comprising: a processor; and a memory that stores executable instructions that, when executed by the processor, facilitate performance of operations, comprising: receiving data representing a time series of failures of outgoing handovers corresponding to a source device, wherein the outgoing handovers comprise outbound communication transfers from a source cell of the source device to target cells; and in response to quantifying the time series based on a metric, identifying, based on a determined condition corresponding to the metric, that the source cell corresponds to an anomalous cell relation, wherein the anomalous cell relation comprises the source cell and a target cell of the target cells.

In various embodiments, the quantifying can include quantifying the time series with respect to a volume of the failures of the outgoing handovers during a period of time; quantifying the time series with respect to a standardized entropy calculated on a probability distribution of the failures of the outgoing handovers by determined relations between the source cell and the target cells; and/or quantifying the time series with respect to a standardized entropy calculated on a probability distribution of determined outgoing handover outcomes.

In one embodiment, the identifying that the source cell corresponds to the anomalous cell relation includes determining that the standardized entropy calculated on the probability distribution of the failures of the outgoing handovers by determined relations between the source cell and the target cells satisfies the determined condition.

Another embodiment can include a computer-readable storage device comprising executable instructions that, in response to execution, cause a system comprising a processor to perform operations, comprising: receiving data representing a time series of failures of outgoing handovers corresponding to a source device, wherein the outgoing handovers comprise outbound communication transfers from a source cell of the source device to target cells; and in response to quantifying the time series based on a determined metric, identifying that the source cell corresponds to a sets of cells associated with an anomalous handover failure condition—the set of cells including the source cell and a target cell of the target cells.

In an embodiment, the quantifying can include quantifying the time series with respect to an entropy calculated on a probability distribution of the failures of the outgoing handovers by determined relations between the source cell and the target cells. In one embodiment, the identifying includes identifying that the set of cells is an anomalous cell relation using entropy based clustering in response to determining that an entropy calculated on a probability distribution of the failures of the outgoing handovers by determined relations between the source cell and the target cells satisfies the determined metric.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a gateway, UE, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by handover anomaly correlation system 130 (see below).

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Further, as used herein, the terms "user," "subscriber," "customer," "consumer," "operator," "network maintenance operator," "administrator," and the like refer generally to human entities or automated components supported through artificial intelligence (e.g., a capacity to make inference based on complex mathematical formalisms), which can provide simulated vision, sound recognition and so forth.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Further, the terms "server," "communication server," and the like, are utilized interchangeably in the subject application, and refer to a network component or appliance that serves and receives data, control, voice, video, sound, gaming, or substantially any data-stream or signaling-stream to/from other network components, subscriber stations, etc. Data and signaling streams can be packetized or frame-based flows. A network typically includes a plurality of elements that host logic for performing tasks on the network. The logic can be hosted on servers. In modern packet-based wide-area networks, servers may be placed at several logical points on the network. Servers may further be in communication with databases and can enable communication devices to access the contents of a database. Billing servers, application servers, etc. are examples of such servers. A server can include several network elements, including other servers, and can be logically situated anywhere on a service provider's network, such as the back-end of a cellular network. A server can host or can be in communication with a database hosting an account for a user of a mobile device. The "user account" includes several attributes for a particular user, including a unique identifier of the mobile device(s) owned by the user, relationships with other users, application usage, location, personal settings, business rules, bank accounts, and other information. A server may communicate with other servers on different networks to update a user account.

Aspects, features, and/or advantages of the disclosed subject matter can be exploited in substantially any wireless telecommunication or radio technology, e.g., Institute of Electrical and Electronics Engineers (IEEE) 802.XX technology, e.g., Wi-Fi, Bluetooth, etc; worldwide interoperability for microwave access (WiMAX); enhanced general packet radio service (enhanced GPRS); third generation partnership project (3GPP) long term evolution (LTE); third generation partnership project 2 (3GPP2); ultra mobile broadband (UMB); 3GPP universal mobile telecommunication system (UMTS); high speed packet access (HSPA); high speed downlink packet access (HSDPA); high speed uplink packet access (HSUPA); LTE advanced (LTE-A), global system for mobile communication (GSM), near field communication (NFC), Wibree, Wi-Fi Direct, etc.

Further, selections of a radio technology, or radio access technology, can include second generation (2G), third generation (3G), fourth generation (4G), etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., user equipment (UE), and/or within one or more elements of a network infrastructure, e.g., radio network controller, wireless access point (AP), etc.

Moreover, terms like "user equipment," (UE) "mobile station," "mobile subscriber station," "access terminal," "terminal", "handset," "appliance," "machine," "wireless communication device," "cellular phone," "personal digital assistant," "smartphone," "wireless device", and similar terminology refer to a wireless device, or wireless communication device, which is at least one of (1) utilized by a subscriber of a wireless service, or communication service, to receive and/or convey data associated with storage of objects within a vehicle, voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

Likewise, the terms "local wireless communications cite," "access point" (AP), "base station," "Node B," "eNodeB," "home Node B" (HNB), "home access point" (HAP), and the like are utilized interchangeably in the subject specification and drawings and refer to a wireless network component or apparatus that sends and/or receives data associated with voice, video, sound, and/or substantially any data-stream or signaling-stream between a set of subscriber stations—unless context warrants particular distinction(s) among the terms. Further, the data and signaling streams can be packetized or frame-based flows.

A communication network, e.g., wireless network environment 100 (see below), for systems, methods, and/or apparatus disclosed herein can include any suitable mobile and/or wireline-based circuit-switched communication network including a global systems for mobile communication (GSM) network, a time division multiple access (TDMA) network, a code division multiple access (CDMA) network, such as IS-95 and subsequent iterations of CDMA technology, an integrated digital enhanced network (iDEN) network and a public switched telephone network (PSTN). Further, examples of the communication network can include any suitable data packet-switched or combination data packet/circuit-switched communication network, wired or wireless IP network such as a VoLTE network, a VoIP network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a wireless system e.g., a wireless communication device, UE 102, etc. for systems, methods, and/or apparatus disclosed herein can include a mobile device, a mobile phone, a 4G, etc. cellular communication device, a PSTN phone, a cellular communication device, a cellular phone, a satellite communication device, a satellite phone, a VoIP phone, Wi-Fi phone, a dual-mode cellular/Wi-Fi phone, a combination cellular/VoIP/Wi-Fi/WiMAX phone, a portable computer, or any suitable combination thereof. Specific examples of a wireless system can include, but are not limited to, a cellular device, such as a GSM, TDMA, CDMA, IS-95 and/or iDEN phone, a cellular/Wi-Fi device, such as a dual-mode GSM, TDMA, IS-95 and/or iDEN/VoIP phones, UMTS phones, UMTS VoIP phones, or like devices or combinations thereof.

FIG. 1 illustrates a wireless network environment 100 that includes a handover anomaly correlation system 130 that facilitates optimizing neighbor cell relationships by interpreting handover failures, in accordance with an embodiment. It should be appreciated that although handover anomaly correlation system 130 is illustrated in FIG. 1 as an entity distinct from base station/eNodeB 110, handover anomaly correlation system 130 can be located/included within and/or across one or more components, e.g., hardware, software, etc., of wireless network environment 100. For example, in one embodiment, handover anomaly correlation system 130 can be located within any component(s) of an evolved UMTS terrestrial radio access network (e-UTRA), GSM, and/or UMTS core network, e.g. service provider network 155. Moreover, it should be appreciated that features and advantages of the subject innovation can be implemented in microcells, picocells, femtocells, or the like, wherein base station/eNodeB 110 can be embodied in an access point.

Each macro cell area 105 represents a "macro" cell coverage area that is served by a base station/eNodeB 110, e.g., a source or target cell as described above. It should be appreciated that macro cell area 105 is illustrated as a hexagon; however, macro cell area 105 can adopt other geometries generally dictated by a deployment or topography of the macro cell coverage area, or covered geographic area, e.g., metropolitan statistical area (MSA), rural statistical area (RSA), etc. Macro cell coverage is generally intended to serve mobile wireless devices, e.g., mobile wireless device 120, in outdoor locations. An over-the-air wireless link 115 provides the macro coverage, and wireless link 115 comprises a downlink (DL) and an uplink (UL) (both not shown) that can utilize a predetermined band of radio frequency (RF) spectrum associated with, e.g., LTE, LTE-A, etc. Accordingly, mobile wireless device 120 can be an LTE based mobile phone.

Base station/eNodeB 110—including associated electronics, circuitry and/or components—and wireless link 115 form a radio network, e.g., e-UTRA. In addition, base station/eNodeB 110 communicates with macro network platform 108 via backhaul link(s) 151. Macro network platform 108 represents a core network comprising one or more cellular wireless technologies, e.g., 3GPP UMTS, GSM, LTE, LTE-A, etc. In one aspect, macro network platform 108 controls a set of base stations/eNodeBs that serve respective cell(s), EUTRAN cell(s), sectors(s), etc. within and/or between the set of base stations, eNodeBs, etc. Macro network platform 108 can also communicate with other base stations (not shown) that serve other cells (not shown). Backhaul link(s) 151 can include a wired backbone link, e.g., optical fiber backbone, twisted-pair line, T1/E1 phone line, synchronous or asynchronous digital subscriber line (DSL), asymmetric DSL (ADSL), coaxial cable, etc.

Packet communication, e.g., voice traffic, data traffic, is typically routed through a broadband wired network backbone (or backhaul network) utilizing, e.g., optical fiber backbone, twisted-pair line, T1/E1 phone line, synchronous or asynchronous digital subscriber line (DSL), asymmetric DSL (ADSL), coaxial cable, etc. To this end, base station/eNodeB 110 is typically connected to the backhaul network, e.g., service provider network 155, via a broadband modem (not shown) and backhaul link(s) 151. Through backhaul link(s) 151, base station/eNodeB 110 can handle substantially any quality of service (QoS) for heterogeneous packetized traffic, e.g., various multiple packet flows.

Base station/eNodeB 110 can integrate into an existing network, e.g., e-UTRA, GSM, or 3GPP network via various interfaces, for example: via an A-bis interface (not shown) between a base transceiver station (BTS) and a base station controller (BSC); via an Iub interface (not shown) between a radio network controller (RNC) and base station/eNodeB 110; via an interface (not shown) between an RNC and a circuit switched core network (CS-CN); via an interface (not shown) between an RNC and an Iu-CS interface; via an interface (not shown) between an RNC and a packet switched core network (or Iu-PS interface); via an interface (not shown) between a BSC and a mobile switching center (MSC) and/or network switching subsystem (NNS); via an interface (not shown) between a serving general packet radio service support node (SGSN) and a public data network (PDN) (or Gi interface); via an interface (not shown) between an SGSN and other SGSNs (or Gn interface).

Handover relates to transferring a phone call, or communication, in progress from a source cell to a target cell to avoid terminating or dropping the phone call—the source and target cells associated with macro cell area 105, for example, or associated with EUTRAN cells within and/or between macro cell areas 105. Conventionally, two types of handover exist: hard handover and soft handover. Hard handover utilizes a break-then-make procedure in which a channel of a source cell associated with a call is released before another channel in a target cell is utilized for the call. Soft handover utilizes a make-then-break procedure in which the channel of the source cell is used while the channel of the target cell is used—connection to the target cell is established before breaking the connection to the source cell.

In other embodiment(s), wireless network environment 100 can include data store component(s), a memory configured to store information, and/or computer-readable storage media storing computer-executable instructions enabling various operations performed via handover anomaly correlation system 130 and described herein.

Figure 2:
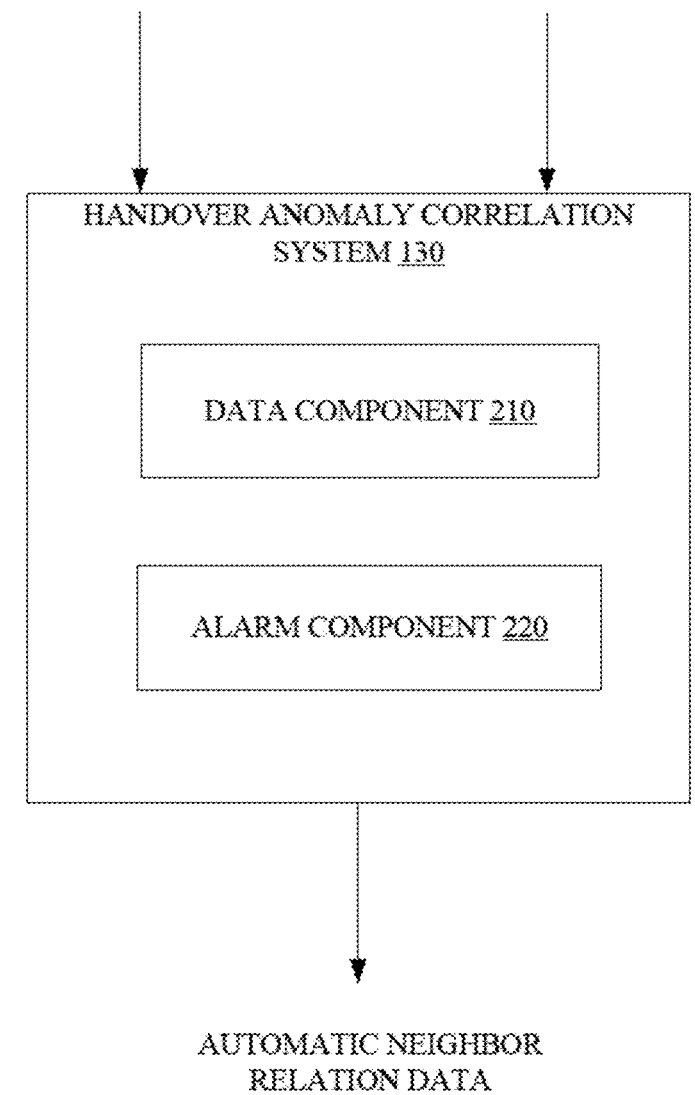
FIG. 2 illustrates a block diagram of a handover anomaly correlation system, in accordance with various embodiments.

Now referring to FIG. 2, handover anomaly correlation system 130 can include a data component 210 and an alarm component 220. Data component 210 can receive data representing a daily, hourly, etc. time series of failures of outgoing handovers corresponding to base station/eNodeB 110. Further, and referring now to FIG. 3, in one embodiment, data component 210 can quantify the time series based on a volume metric corresponding to the daily, hourly, etc. time series, e.g., 310, of the failures of the outgoing handovers, e.g., with respect to a total number of outgoing handover failures of EUTRAN cells of base station/eNodeB 110, with respect to a total number of outgoing handover failures of a EUTRAN cell of base station/eNodeB 110, etc. that occur during a determined period of time, e.g., day, week, etc.

In an embodiment, data component 210 can quantify the time series, e.g., 320, based on a standardized entropy metric corresponding to a standardized entropy calculated on a probability distribution of the failures of the outgoing handovers by determined relations between the source cell and the target cells, e.g., by a given EUTRAN cell neighboring cell relation.

In one embodiment, data component 210 can quantify the time series, e.g., 330, based on a standardized entropy metric corresponding to a standardized entropy calculated on a probability distribution of determined outgoing handover outcome, disposition, etc., e.g., pass/fail.

In various embodiments, an entropy H(X) can be determined according to Equation 1 below:

$$H(X) = -\sum_{x_i \in X} p(x_i) \log p(x_i), \quad (1)$$

in which random variable X takes on $N_X$ discrete values, X is randomly sampled or observed for m times, $P(x_i) = m_i/m$, $x_i \varepsilon X$, $m_i$ is the frequency of X taking the value $x_i$, and in which $0 \leq H(X) \leq H_{max}(X) = \log(\min(NX, m))$.

Further, a standardized entropy calculated on a probability distribution, e.g., of failures of the outgoing/incoming handovers by determined relations, of determined outgoing/incoming handover outcome, etc. can be determined according Equation 2 below:

$$\text{Standardized Entropy} = H(X)/H_{max}(X) \quad (2)$$

In one embodiment corresponding to the standardized entropy calculated on the probability distribution of the failures of the outgoing/incoming handovers by determined relations, X represents eNodeB neighboring cell relations, $x_i$ represents a specific eNodeB neighboring cell relation, m represents number of eNodeB failed handovers, and $m_i$ represents a number of eNodeB failed handovers for a neighboring cell relation i.

In another embodiment corresponding to the standardized entropy calculated on the probability distribution of determined outgoing/incoming handover outcome, X represents a value corresponding to handover outcomes with respect to handover requests corresponding to an eNodeB, $x_i$ represents a specific handover outcome, e.g., pass/fail, with respect to a handover request of the handover requests, m represents a number of handover attempts with respect to the eNodeB, and $m_i$ represents a number of handovers of a given outcome, e.g., pass/fail, at the eNodeB.

In yet another embodiment, data component 210 can generate, based on the data, the daily, hourly, etc. time series of failures of the outgoing handovers, and analyze such time series with respect to weekly/daily periodicity, e.g., with respect to daily/hourly variation of outgoing handover failures within a week/day.

In one embodiment, data component 210 can generate, based on the data, the daily, hourly, etc. time series associated with the standardized entropy metric corresponding to the standardized entropy calculated on the probability distribution of the failures of the outgoing handovers by given EUTRAN cell neighboring cell relation, and analyze such time series with respect to weekly/daily periodicity, e.g., with respect to a daily/hourly variation of such standardized entropy metric within a week/day.

In an embodiment, data component 210 can generate, based on the data, the daily, hourly, etc. time series of the standardized entropy metric corresponding to the standardized entropy calculated on the probability distribution of determined outgoing handover outcomes, and analyze such time series with respect to weekly/daily periodicity, e.g., with respect to a daily/hourly variation of such standardized entropy metric within a week/day.

In this regard, alarm component 220 can identify, based a determined condition corresponding to the volume metric, the standardized entropy metric corresponding to the standardized entropy calculated on the probability distribution of the failures of the outgoing handovers by given EUTRAN cell neighboring cell relation, and/or the standardized entropy metric corresponding to the standardized entropy calculated on the probability distribution of determined outgoing handover outcomes, an outgoing handover "threshold crossing alert" representing an existence of an anomalous cell relation(s) corresponding to the time series of the failures of the outgoing handovers.

In yet another embodiment, alarm component 220 can generate the outgoing handover threshold crossing alert by decomposing a time series, e.g., of a number of outgoing handover failures, etc. into three components: a) a trend component representing low frequency (e.g., seasonal or strictly periodic) variation in the data such as variation/seasonality among 24 hourly observations within a period corresponding to a day, variation/seasonality among 7 daily observations within a period corresponding to a week, etc.; b) a non-stationary, long term change in level, e.g., a trend; and c) a remainder/residual component representing the remaining variation in the data after the seasonal and trend components are removed.

For example, decomposition of the time series can be implemented via a sequence of local regression (LOESS) smoothings. LOESS is procedure that can be used for fitting a polynomial surface (e.g., quadratic surface) for each predicted point using only nearby data points (e.g., by weighted least squares) to ensure that "local" data points are most influential. In one embodiment, a seasonal (e.g., hourly/daily) component for the specified period (e.g., day/week) can be generated; seasonal values can be removed; and the remainder smoothed based on LOESS to find the trend. The overall level is then removed from the seasonal component and then added to the trend component. The remainder component is defined as the residuals from the seasonal plus the trend fit.

If the data, the trend component, the seasonal component, and the remainder component are denoted by Yv, Tv, Sv and R v, for v=1, . . . , N, then: Yv=Tv+Sv+Rv, in which seasonality is modeled as an additive, and not a multiplicative, component. In this regard, by examining a time series in which the seasonal component is removed, e.g., Yv−Sv=Tv+Rv, upward and downward spikes in Yv-Sv can be analyzed to generate a threshold crossing alert, e.g., an outgoing handover threshold crossing alert, an incoming handover threshold crossing alert, etc.

In an embodiment, alarm component 220 can utilize a Holt-Winters' three-parameter exponential smoothing model (see Equation 3) to generate a threshold crossing alert, e.g., the outgoing handover threshold crossing alert, an incoming handover threshold crossing alert (see below), etc. Such model can assume that a time series can be decomposed into three components:

$$y_t = (b_1 + b_2 t)S_t + \varepsilon_t, \quad (3)$$

with $b_1$=overall mean, $b_2$=linear trend, and $S_t$=seasonal trend.

In this regard, in one embodiment, alarm component 220 can adaptively adjust a threshold at which the threshold crossing alert can be generated given the following:

Let μ represent the current estimate of the overall mean.

Let $S_i$ represent the current estimate of the seasonality factor for time interval i, that is, the mean of a particular interval in relation to the overall mean.

For example, if the daily mean traffic volume is 50 GB/hour, but the mean traffic volume at 2:00 pm is 75 GB/hour, the seasonality factor $S_{2:00\,pm}$=75/50=1.5 (assuming a daily cycle or period).

Let Var represent the current estimate of the overall normalized variance (e.g., the variance if there were no seasonality effects).

Variance is assumed to be approximately proportional to the seasonality factor or, equivalently, the mean, e.g., the variance expected to be larger if the mean is higher, so that an estimate of the variance for a given time interval i would be $S_i$Var.

A threshold range, including an upper control limit (UCL) and a lower control limit (LCL) will be wider during peak intervals and narrower during non-peak intervals as opposed to a threshold that assumes fixed variance according to Equations 4 and 5:

$$UCL = (S_i\mu) + (THRESHOLD\_LEVEL * sqrt(S_i * Var)),\quad(4)$$

$$LCL = (S_i\mu) - (THRESHOLD\_LEVEL * sqrt(S_i * Var)).\quad(5)$$

Given a new data point, X, e.g., a measured or observed value of a number of outgoing/incoming handover failures, a derived value of a standardized entropy calculated on a probability distribution of failures of outgoing/incoming handovers by neighboring cell relation, a derived value of a standardized entropy calculated on a probability distribution of determined outgoing/incoming handover outcome, etc. for a time interval i, e.g., day of week, alarm component 220 can determine an estimated baseline $S_i$, e.g., an expected number of outgoing/incoming handover failures, an expected value of the standardized entropy calculated on the probability distribution of the failures of the outgoing/incoming handovers by neighboring cell relation, an expected value of the standardized entropy calculated on the probability distribution of the outgoing/incoming handover outcome, etc. for the time interval i, with an estimated variance of $S_i$Var.

Further, alarm component 220 can determine, calculate, etc. a deviation score, D, which represents a measure of the deviation of X from the estimated baseline according to Equation 6:

$$D = \frac{(X - S_i\mu)}{\sqrt{S_i Var}}.\quad(6)$$

In an embodiment, alarm component 220 can normalize the deviation score for mean, seasonality, e.g., day of week, and variance.

If THRESHOLD_LEVEL is the level at which alarm component 220 generates the threshold crossing alert, then alarm component 220 can generate the threshold crossing alert when D>THRESHOLD_LEVEL or D<−THRESHOLD_LEVEL.

In another embodiment, alarm component 220 can calculate new estimates for the above parameters using Equations 7 to 11:

$$\mu_{New} = \alpha\theta\frac{X}{S_i} + (1-\alpha\theta)\mu,\quad(7)$$

$$S_{iNew} = \beta\theta\frac{X}{\mu} + (1-\beta\theta)S_i,\quad(8)$$

$$Var_{New} = \max\left(\gamma\theta S_i\left(\frac{X}{S_i} - \mu\right)^2 + (1-\gamma\theta)Var, MinSD^2\right), with\quad(9)$$

$$i = \text{interval of cycle, and}\quad(10)$$

$$0 < \alpha, \beta, \gamma < \frac{1}{\theta}, MinSD > 0\ (\text{minimum}SD).\quad(11)$$

Further, after a check for handover anomalies, e.g., after determining whether there is a threshold crossing alert, alarm component 220 can perform adaptive thresholding by updating the above parameters according to Equation 12:

$$\mu = \mu_{New},\ S_i = S_{iNew},\ Var = Var_{New}\quad(12)$$

In one embodiment, during a "ramp up phase", e.g., in which handover estimates are unknown or unstable, alarm component 220 can set a ramp-up factor θ>1, e.g., to give current handover observations more weight, to speed up convergence, etc. Further, during the ramp-up phase, alarm component 220 does not generate outgoing/incoming handover alert(s), alarm(s), etc.

In another embodiment, alarm component 220 can determine the threshold crossing alert utilizing an exponential smoothing model, e.g., based on Equations 1-12, etc. that normalizes a measure of a deviation of data representing a number of outgoing/incoming handover failures from an estimated, expected, etc. baseline, or number, etc. of expected outgoing/incoming handover failures, e.g., based on a mean, seasonality, e.g., day of week, variance, etc.

Figure 3:
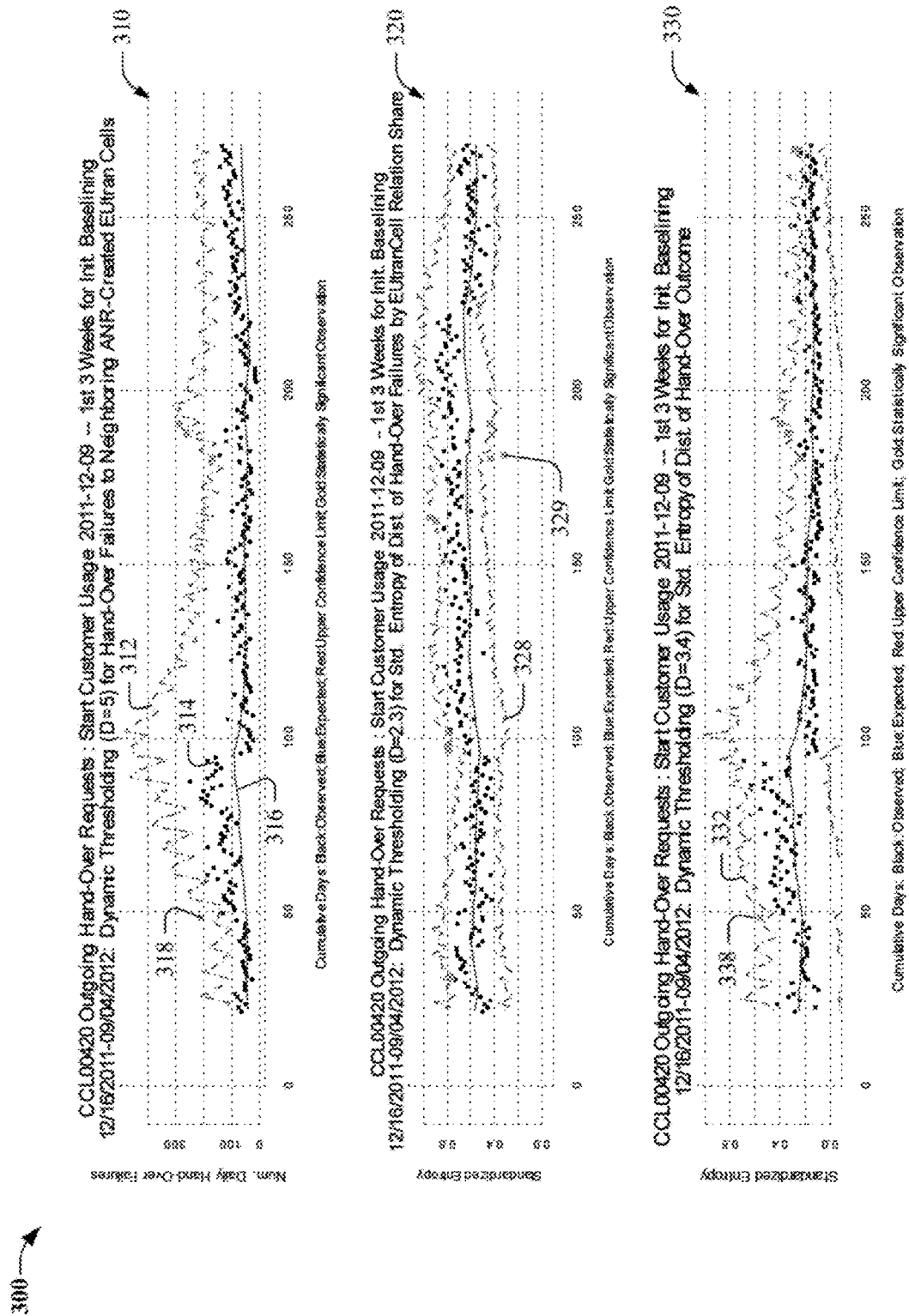
FIG. 3-7 illustrates plots of information associated with a handover anomaly correlation system, in accordance with various embodiments.

Now referring to FIG. 3, plot 310 represents a number of daily outgoing handover failures at a source eNodeB corresponding to neighboring ANR created EUTRAN cells. In this regard, alarm component 220 can generate an outgoing handover threshold crossing alert at 318 in response determining that the number of daily outgoing handover failures during a period of time, e.g., a day, exceeds, is above, etc. UCL 312, which can be computed by alarm component 220 per Equation 4 above. It should be appreciated that 314 and 316 correspond to observed handover failures and expected handover failures, respectively.

In another embodiment, plot 320 represents a time series of a standardized entropy calculated on a probability distribution of the failures of the outgoing handovers by given EUTRAN cell neighboring cell relation. In this regard, alarm component 220 can generate the outgoing handover threshold crossing alert at 329 in response to determining that the standardized entropy calculated on the probability distribution of the failures of the outgoing handovers by given EUTRAN cell neighboring cell relation is below LCL 328, which can be computed by alarm component 220 per Equation 5 above.

In yet another embodiment, plot 330 represents a time series of a standardized entropy calculated on a probability distribution of determined outgoing handover outcomes, e.g., pass/fail. In this regard, alarm component 220 can generate the outgoing handover threshold crossing alert at 338 in response to determining that the standardized entropy of the probability distribution of outgoing handover outcome is above UCL 332, which can be computed by alarm component 220 per Equation 4 above.

In an embodiment, based on detection of the outgoing handover threshold crossing alert, alarm component 220 can send a message directed to service personal, technician(s), etc., e.g., alerting the service personal, technician(s), etc. to perform root cause analysis of the anomalous cell relation(s), e.g., to analyze determined performance metrics corresponding to the source cell.

In another embodiment, alarm component 220 can analyze, based on the outgoing handover threshold crossing alert, the performance and/or service metrics, e.g., determining whether there is a problem with a backbone, communication link(s), etc. of an associated network, determining whether maintenance was performed, recently performed, etc. on a set of eNodeBs corresponding to the source cell, etc.

Figure 4:
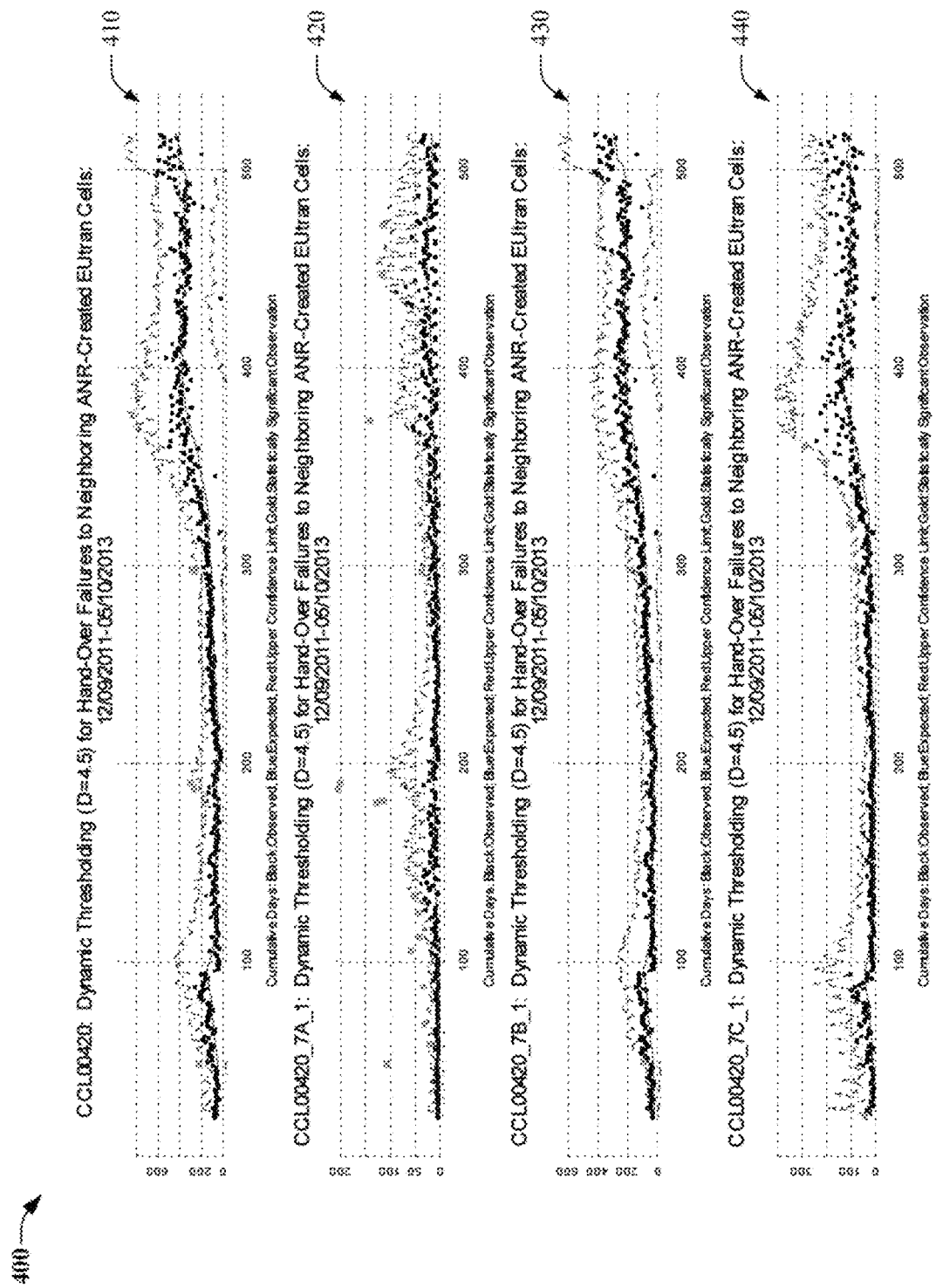

In an embodiment illustrated by FIG. 4, data component 210 can generate data corresponding to plots 410-440 associated with EUTRAN cells, sectors, etc. of a source eNodeB. Plot 410 represents a number of daily outgoing handover failures at the source eNodeB corresponding to neighboring ANR created EUTRAN cells. Further, plots 420-440 represent a number of daily outgoing handover failures at respective EUTRAN cells, sectors, etc. of the source eNodeB. In this regard, alarm component 220 can generate the outgoing handover threshold crossing alert in response to determining that the number of daily outgoing handover failures during a period of time at one of the EUTRAN cells, sectors, etc. exceeds, is above, etc. a respective UCL that can be computed by alarm component 220 per Equation 4 above.

Figure 5:
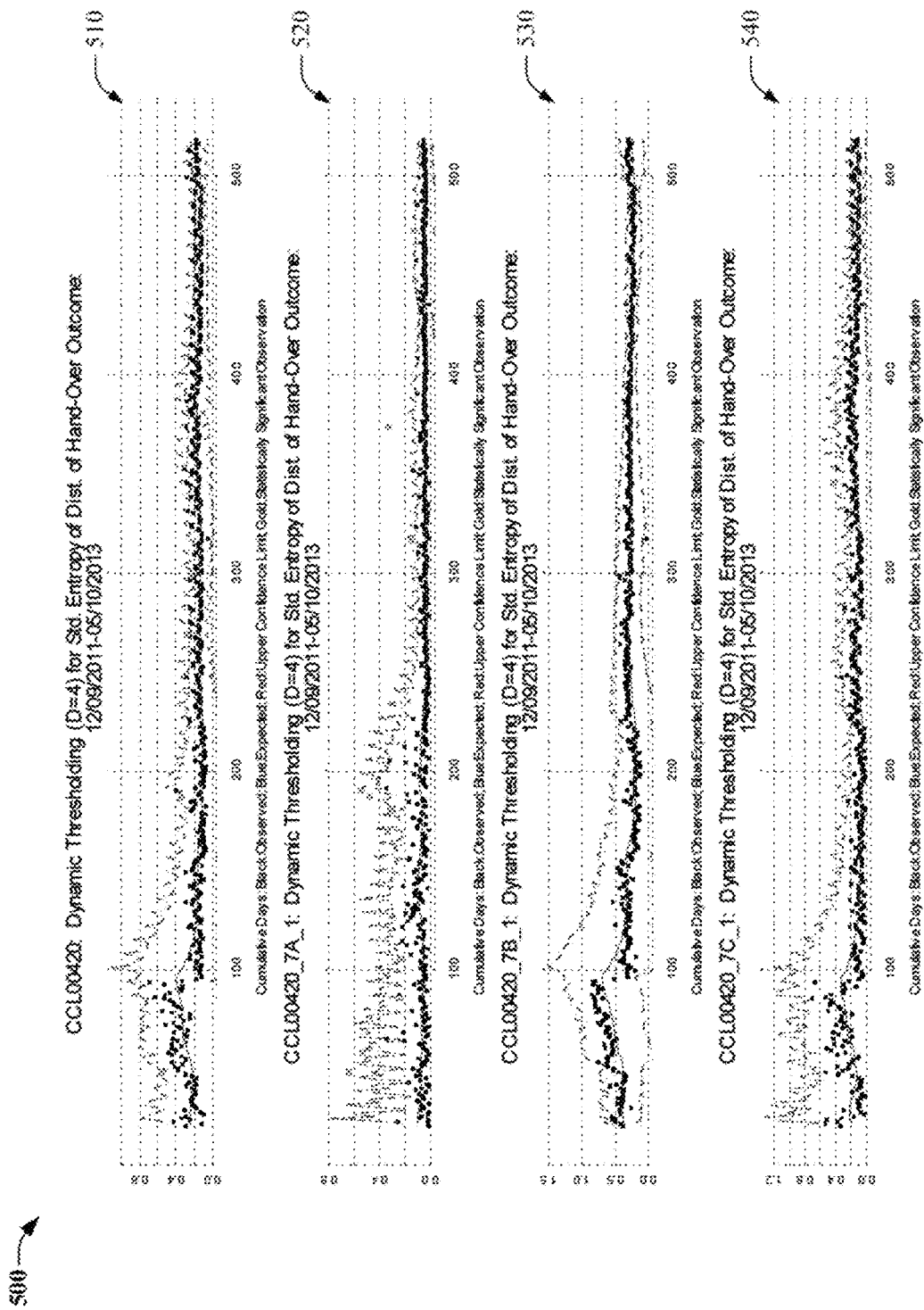

In another embodiment illustrated by FIG. 5, data component 210 can generate data corresponding to plots 510-540 associated with EUTRAN cells, sectors, etc. of a source eNodeB. Plot 510 represents a standardized entropy of a probability distribution of handover outcome at the source eNodeB. Further, plots 520-540 represent standardized entropies of probability distributions of handover outcomes at respective EUTRAN cells, sectors, etc. of the source eNodeB. In this regard, alarm component 220 can generate the threshold crossing alert in response to determining that the standardized entropy of the probability distribution of outgoing handover outcome at one of the EUTRAN cells, sectors, etc. exceeds, is above, etc. a respective UCL that can be computed by alarm component 220 per Equation 4 above.

Although not illustrated, it should be appreciated, in one embodiment, that data component 210 can generate data associated with EUTRAN cells, sectors, etc. of a source eNodeB corresponding to standardized entropies calculated on probability distributions of failures of outgoing handovers given EUTRAN cell neighboring cell relations with respect to the EUTRAN cells, sectors, etc. of the source eNodeB, e.g., in response to determining that such probability distributions include data points are below respective LCL levels that can be computed by alarm component 220 per Equation 5 above.

In yet another embodiment, in response to determining that the outgoing handover threshold crossing alert was generated based on the determined condition, e.g., in response to determining that the standardized entropy calculated on the probability distribution of the failures of the outgoing handovers by given EUTRAN cell neighboring cell relation is below LCL 328, alarm component 220 can identify a dominant cell relation, e.g., a heavy-hitter neighbor cell relation, of the anomalous cell relation(s) corresponding to the time series of the failures of the outgoing handovers.

In one embodiment, alarm component 220 can determine, identify, etc. the heavy-hitter neighbor cell relation by employing entropy based clustering/extraction. In this regard, alarm component 220 assumes that the probability distribution of the possible values obeys a power law, so that only a relatively few values have significantly larger probabilities while remaining values are close to being uniformly distributed when extracting a set of significant neighbor cell relations. For example, alarm component 220 begins the entropy-based clustering/extraction procedure with selection of an initial threshold for selecting neighbor cell relations whose handover failure share a is greater than an initial threshold value, $\alpha_0$, e.g., $\alpha_0=0.1$.

In response to the standardized entropy of the remaining neighbor cell relations being determined to be less than a threshold $\beta$, approximating a uniform distribution, e.g., $\beta=0.75$, alarm component 220 examines each neighbor cell relation to determine whether such neighbor cell relation's handover failure share exceeds the relation handover failure share threshold value. In response to alarm component 220 determining that the neighbor cell relation's handover failure share exceeds the relation handover failure share threshold value, alarm component 220 includes the neighbor cell relation in a set of significant failing neighbor cell relations.

Further, alarm component 220 can reduce the threshold value $\alpha$ by an exponentially decreasing factor, e.g., $2^{-k}$, following each iteration k. Alarm component 220 terminates the procedure in response to determining remaining non-clustered neighbor cell relations have a probability distribution that is approximately uniform, e.g., $H_s > \beta$. Thus, neighbor cell relations within the resulting cluster are considered by alarm component 220 to represent heavy-hitter neighbor cell relations with respect to handover failures corresponding to an associated eNodeB.

In one embodiment, Table 1 illustrates pseudo-code representing an entropy-based clustering/extraction algorithm,

TABLE 1

| | |
|---|---|
| 1 | Parameters: $\alpha := \alpha_0$; $\beta := \beta_0$; |
| 2 | Initialization: S:=NULL; R:=A; k:=0; Compute $P_A = P(a_i)$ |
| 3 | Compute $P_R$; Compute $\theta := H_S(P_R)$ |
| 4 | while $\theta \le \beta$ do |
| 5 | $\alpha = \alpha X 2^{-k}$; k++ |
| 6 | for each $a_i \in R$ do |
| 7 | if $(P_A(a_i) \ge \alpha)$ then |
| 8 | S:=S U { $a_i$ }; R:=R-{ $a_i$} |
| 9 | end if |
| 10 | end for |
| 11 | Compute $P_R$; Compute $\theta := H_S(P_R)$ |
| 12 | End while | in which $\alpha$ is the threshold value for selecting heavy-hitter neighbor relations, and a heavy-hitter neighbor relation is a neighbor relation, neighbor cell relation, etc. whose handover failure share is greater than or equal to the threshold value specified by $\alpha$;

$\alpha_0$ is the initial specified a value;

$\beta$ is the threshold standardized entropy value used to determine that the standardized entropy calculated on the probability distribution of handover failure share among the non-clustered or residual neighbor relations is a uniform probability distribution, e.g., $\theta = HS(PR)$; $\theta > \beta$, so that algorithm can terminate, e.g., leave the while loop in step #12;

$\beta_0$ is the specified threshold value for $\beta$;

S is the set of clustered neighbor relations, e.g., the set of heavy-hitter neighbor relations;

R is the residual set or the set of non-clustered neighbor relations, e.g., neighbor relations that exhibit failed handovers, but that are not classified as heavy-hitters;

A is the set of all neighbor relations that have failed handovers;

$a_i$ is a specific neighbor relation with failed handovers within set A;

$PA(a_i)$ is the failure share of $a_i$ in set A;

PR is the failure share of $a_i$ in set R;

HS(PR) is the standardized entropy calculated on the probability distribution of handover failure share among the non-clustered, or residual, neighbor relations; and $\theta$ is the standardized entropy calculated on a probability distribution.

In another embodiment, alarm component 220 can utilize a non-parametric outlier detection technique to identify "heavy hitter" failing neighbor cell relations. For example, the distribution of handover failures associated with neighbor cell relations at time t can be analyzed. In this regard, neighbor cell relations whose handover failure volume exceeds Q3+$C_3$*(Q3−Q1)—in which $C_3 >= 1.5$, Q3 represents the third quartile (a $75^{th}$ percentile of handover failure volume), and Q1 represents the first quartile (a $25^{th}$ percentile of handover failure volume)—can be considered by alarm component 220 to be outlier observations and hence "heavy hitter" failing neighbor cell relations.

In an embodiment, in response to identifying the heavy-hitter neighbor cell relation, alarm component 220 can receive incoming handover data representing a daily, hourly, etc. time series of failures of incoming handovers corresponding to a target wireless access point device, target eNodeB, etc.—the heavy-hitter neighbor cell relation including a source cell of the source eNodeB and a target cell of the target eNodeB.

In one embodiment, alarm component 220 can quantify the time series based on an incoming handover volume metric corresponding to the daily, hourly, etc. time series of the failures of the incoming handovers, e.g., with respect to a total number of incoming handover failures of EUTRAN cells of the target eNodeB that occur during a determined period of time, e.g., day, week, etc.

In another embodiment, alarm component 220 can quantify the time series based on an incoming handover standardized entropy metric corresponding to a standardized entropy calculated on a probability distribution of the failures of the incoming handovers by determined relations between the target cell and the source cells, e.g., by a given EUTRAN cell neighboring cell relation.

In yet another embodiment, alarm component 220 can quantify the time series based on an incoming handover standardized entropy metric corresponding to a standardized entropy calculated on a probability distribution of determined incoming handover outcomes, dispositions, etc., e.g., pass/fail.

In an embodiment, alarm component 220 can generate, based on the incoming handover data, the daily, hourly, etc. time series of failures of the incoming handovers, and analyze such time series with respect to weekly/daily periodicity, e.g., with respect to daily/hourly variation of incoming handover failures within a week/day.

In one embodiment, alarm component 220 can generate, based on the incoming handover data, a daily, hourly, etc. time series associated with the incoming handover standardized entropy metric corresponding to the standardized entropy calculated on the probability distribution of the failures of the incoming handovers by given EUTRAN cell neighboring cell relation, and analyze such time series with respect to weekly/daily periodicity, e.g., with respect to a daily/hourly variation of such standardized entropy metric within a week/day.

In yet another embodiment, alarm component 220 can generate, based on the incoming handover data, a daily, hourly, etc. time series of the incoming handover standardized entropy metric corresponding to the standardized entropy calculated on the probability distribution of determined incoming handover outcomes, and analyze such time series with respect to weekly/daily periodicity, e.g., with respect to a daily/hourly variation of such standardized entropy metric within a week/day.

In one embodiment, alarm component 220 can generate an incoming handover threshold crossing alert representing an existence of the anomalous cell relation(s) corresponding to the time series of the failures of the incoming handovers based a determined condition corresponding to the incoming handover volume metric, the incoming handover standardized entropy metric corresponding to the standardized entropy calculated on the probability distribution of the failures of the incoming handovers by given EUTRAN cell neighboring cell relation, and/or the incoming handover standardized entropy metric corresponding to the standardized entropy calculated on the probability distribution of determined incoming handover outcomes.

In another embodiment, alarm component 220 can generate the incoming handover threshold-crossing alert using a seasonal decomposition of the daily, hourly, etc. time series of failures of the incoming handovers, of the standardized entropy metric(s) discussed above, etc. using LOESS smoothing procedures. For example, the system can generate the incoming handover threshold-crossing alert based on detected upward and/or downward spikes in data generated by the LOESS smoothing procedures.

Figure 6:
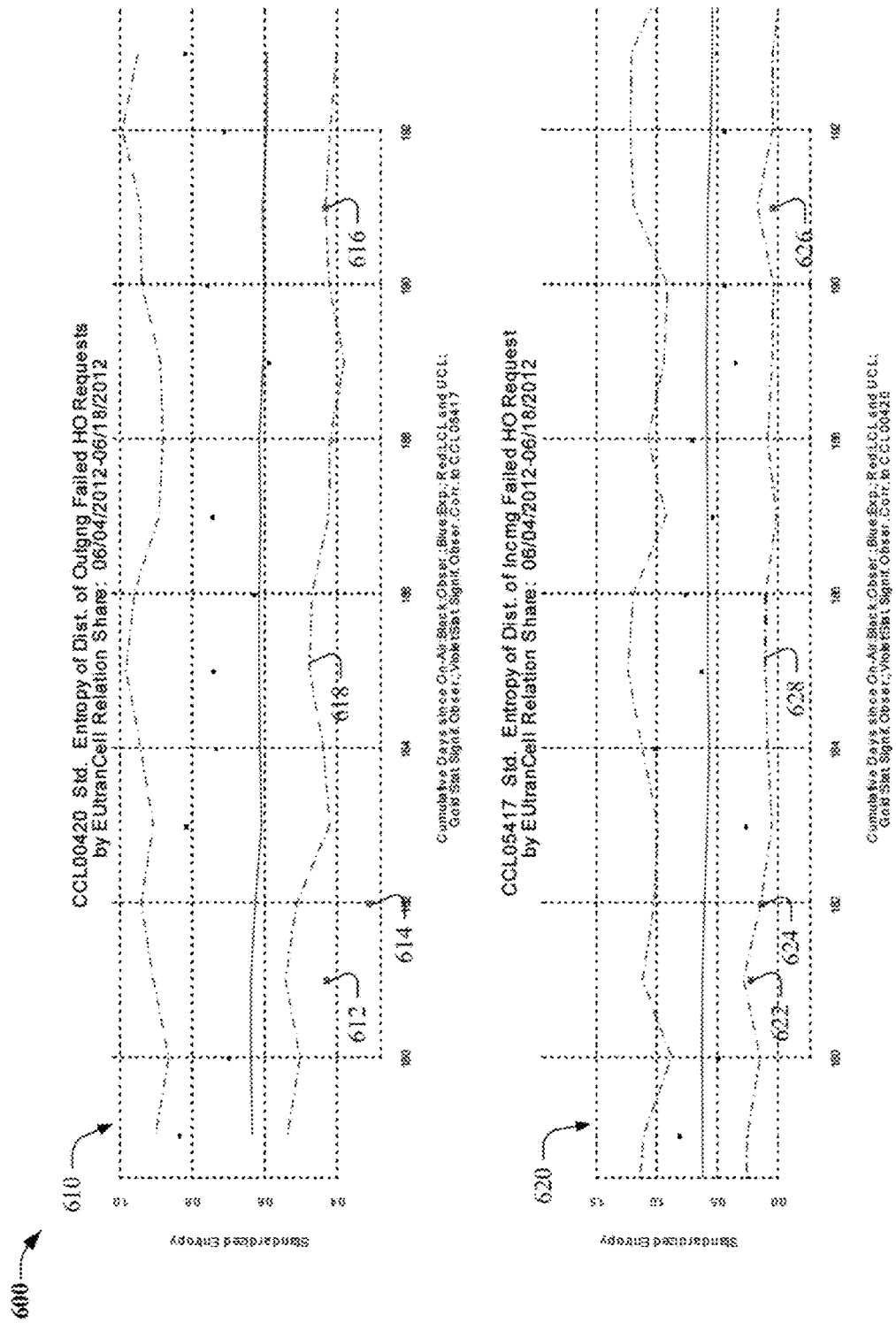

Now referring to an embodiment illustrated by FIG. 6, in response to generating the incoming handover threshold crossing alert, alarm component 220 can correlate outgoing handover threshold crossing alert(s) corresponding to the source cell, source eNodeB, source EUTRAN cell, etc. with incoming handover threshold crossing alert(s) corresponding to the target cell, target eNodeB, target EUTRAN cell, etc. with respect to a time period.

In various embodiments, alarm component 220 can determine whether all incoming handovers fail at the target eNodeB; whether all incoming handovers fail at the target EUTRAN cell during a time corresponding to an outgoing handover threshold crossing alert corresponding to the source cell, source eNodeB, source EUTRAN cell, etc.; whether all incoming handovers from a source EUTRAN cell fail; and/or whether all incoming handovers from the source EUTRAN cell to the target EUTRAN cell fail.

For example, alarm component 220 can correlate outgoing handover threshold crossing alert(s) 612, 614, 616, etc. of respective time periods, which correspond to determinations that the standardized entropy of the probability distribution of outgoing handover failures at eNodeB CCL00420 by EUTRAN cell relation share is below LCL 618 (per Equation 5 above), with incoming handover threshold crossing alert(s) 622, 624, 626, etc. of the respective time periods, which correspond to determinations that the standardized entropy of the probability distribution of incoming handover failures at eNodeB CCL05417 by EUTRAN cell relation share is below LCL 628 (per Equation 5 above).

Figure 7:
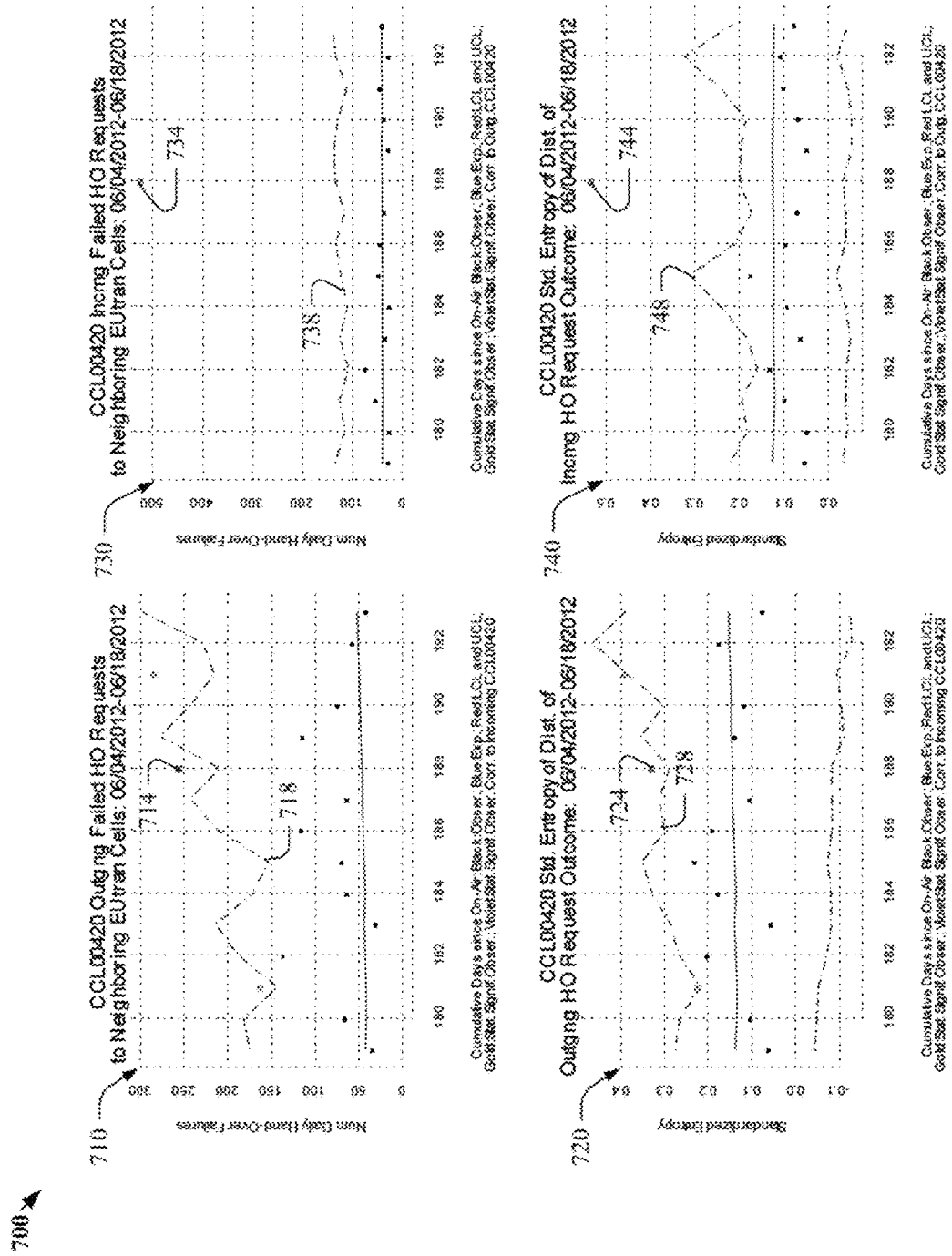

In embodiments illustrated by FIG. 7, alarm component 220 can correlate outgoing handover threshold crossing alert(s) 714, 724, etc. of a time period, which correspond, respectively, to a determination that the number of outgoing daily handover over failures at eNodeB CCL00420 to neighboring EUTRAN cells is above UCL 718 (per Equation 4 above), and to a determination that the standardized entropy of the probability distribution of outgoing handover outcome is above UCL 728 (per Equation 4 above), with incoming handover threshold crossing alerts 734, 744, etc. of the time period, which correspond, respectively, to a determination that the number of daily incoming handover failures at eNodeB CCL00420 to neighboring EUTRAN cells is above UCL 738 (per Equation 4 above), and to a determination that a standardized entropy of a probability distribution of incoming handover outcome is above UCL 748 (per Equation 4 above).

In another embodiment, in response to correlating the outgoing handover threshold crossing alert(s) with the incoming handover threshold crossing alert(s), alarm component 220 can send a message directed to service personal, technician(s), etc., e.g., alerting the service personal, technician(s), etc. to analyze determined performance metrics corresponding to the target cell, target eNodeB, target EUTRAN cell, etc, e.g., for performing a root cause analysis of the anomalous cell relation(s) corresponding to the source cell and the target cell.

In another embodiment, in response to correlating the outgoing handover threshold crossing alert(s) with the incoming handover threshold crossing alert(s), alarm component 220 can analyze the performance metrics corresponding to the target cell, target eNodeB, target EUTRAN cell, etc., e.g., determining whether there is a problem with a backbone, communication link(s), etc. of an associated network, determining whether maintenance was performed, recently performed, etc. on a set of eNodeBs corresponding to the target cell, etc.

Figure 8:
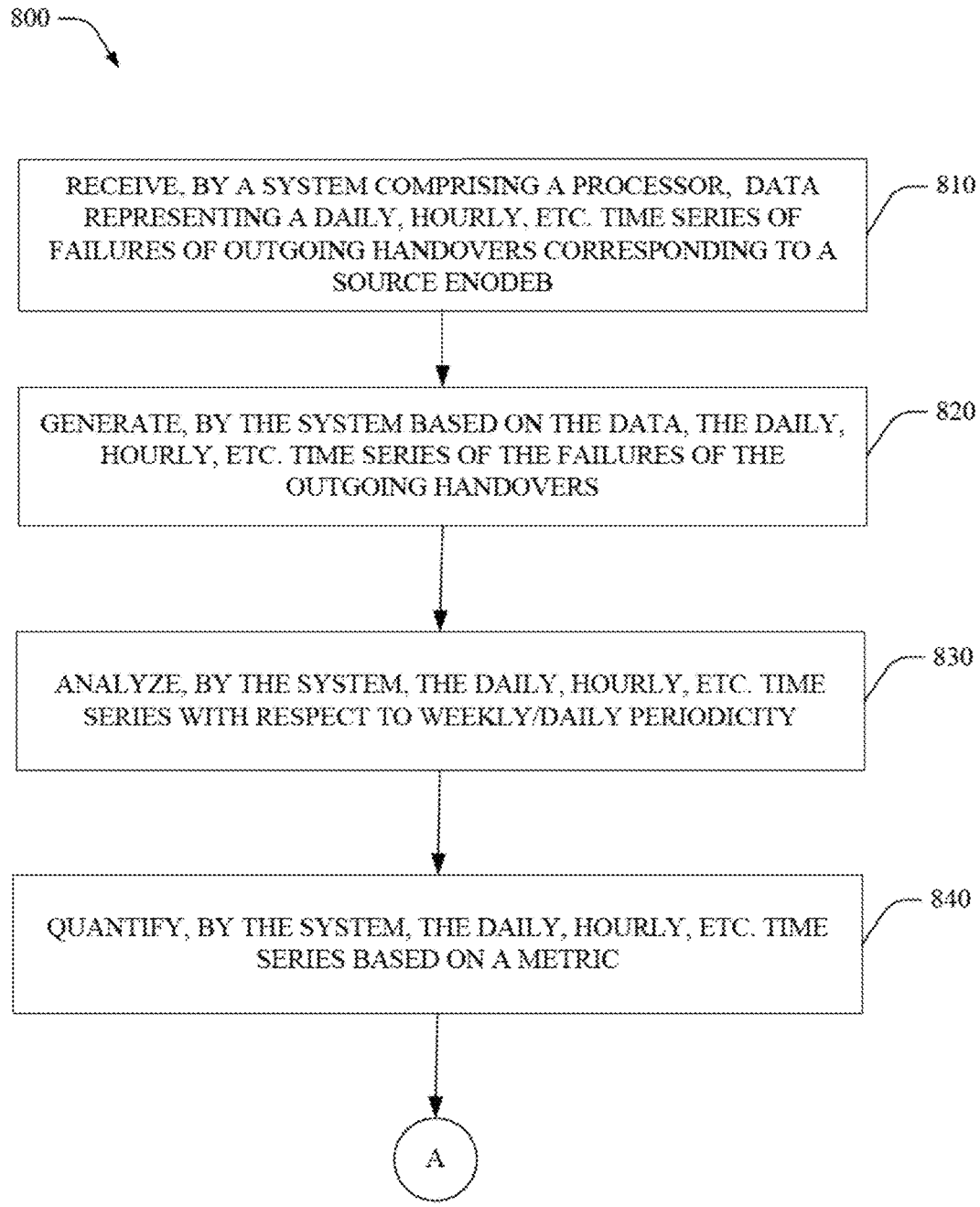
FIGS. 8-10 illustrate flowcharts of methods associated with a handover anomaly correlation system, in accordance with various embodiments.
Figure 9:
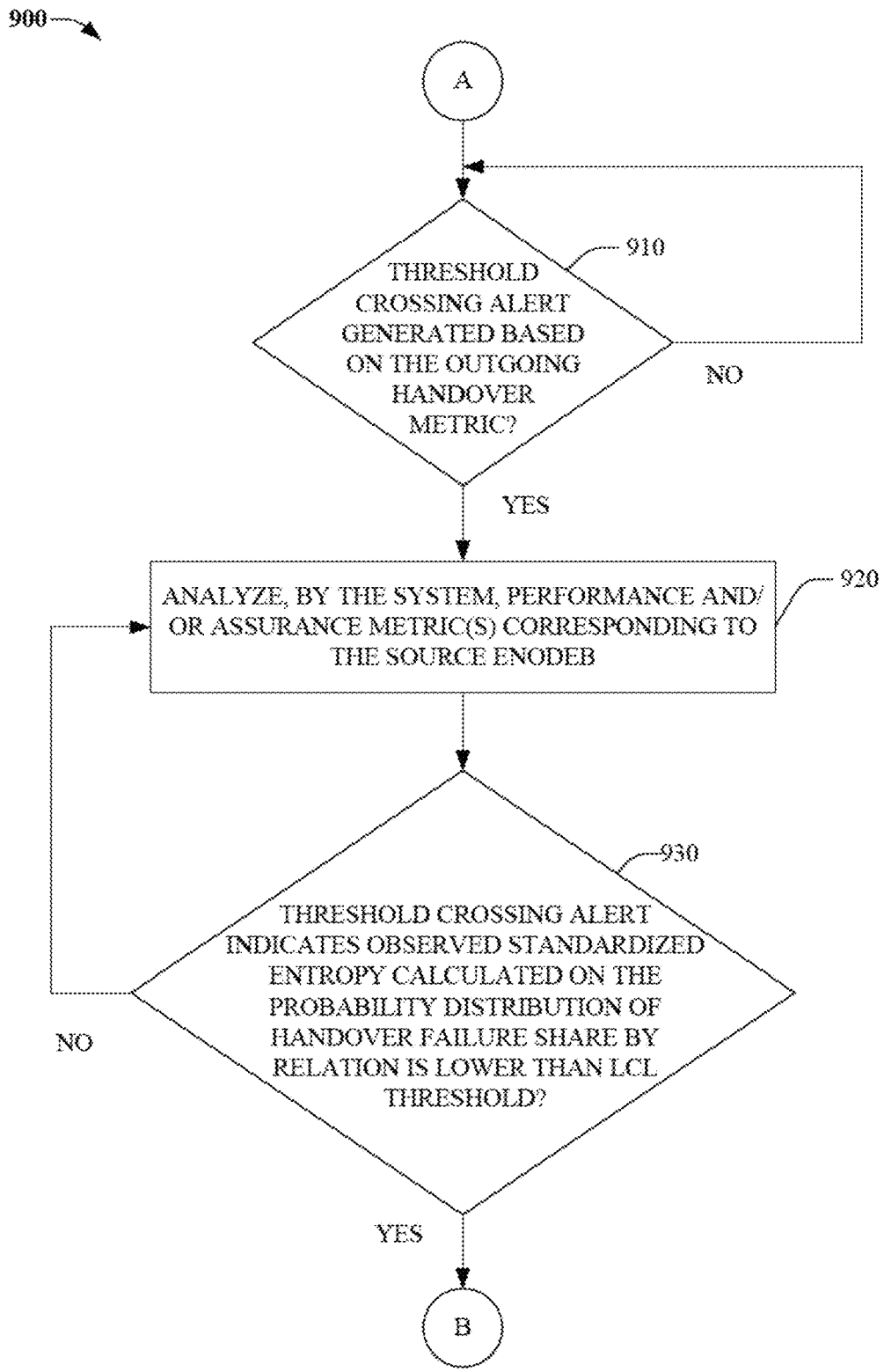
Figure 10:
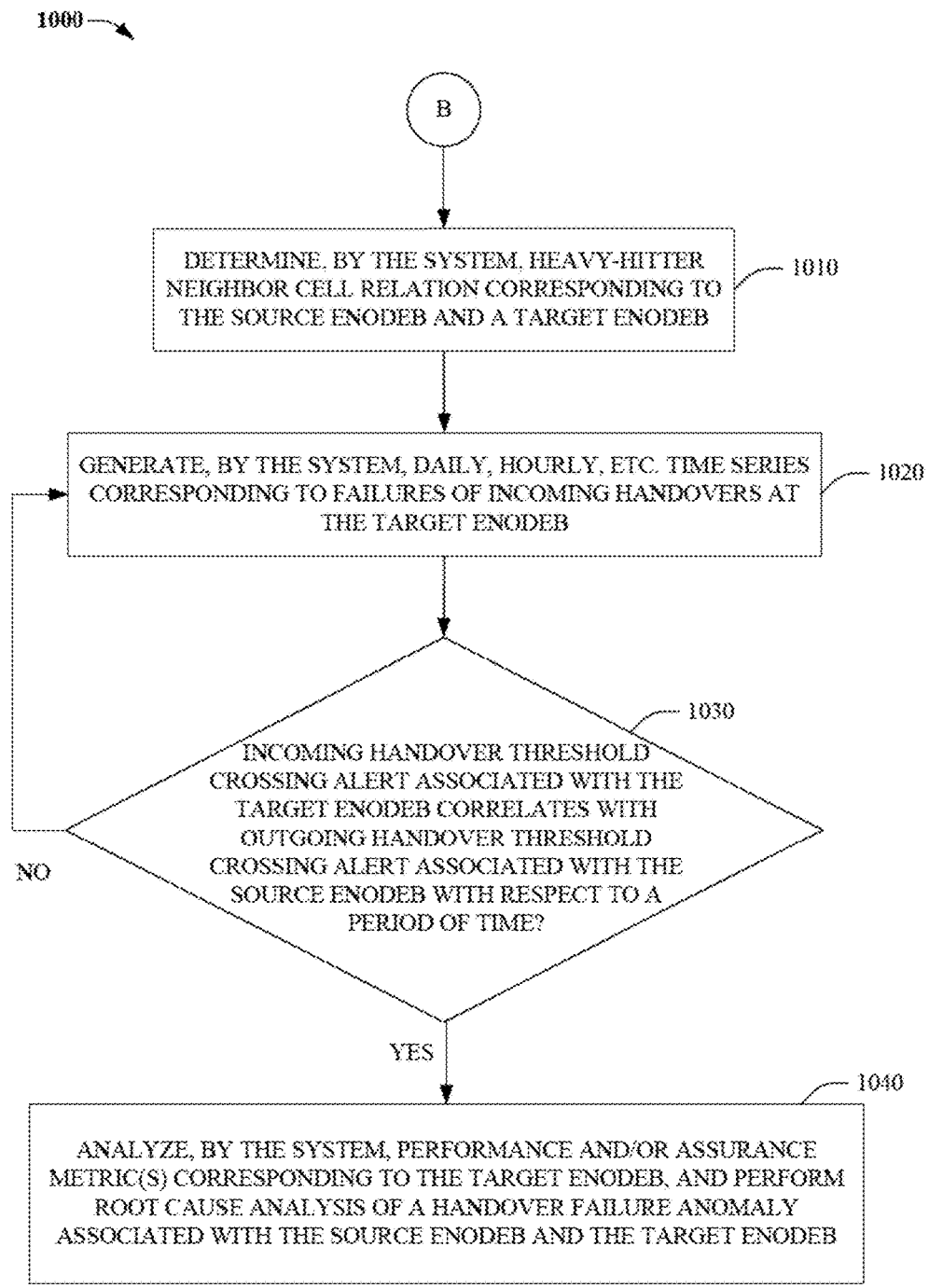

FIGS. 8-10 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIGS. 8-10, processes 800 to 1000 performed by system(s) and/or component(s) described herein, e.g., handover anomaly correlation system 130, are illustrated, in accordance with various embodiments. At 810, data representing a daily, hourly, etc. time series of failures of outgoing handovers corresponding to source NodeB, e.g., corresponding to a EUTRAN cell of the source eNodeB, corresponding to EUTRAN cells of the source eNodeB, etc. can be received, e.g., by a system comprising a processor. At 820, the daily, hourly, etc. time series of the failures of the outgoing handovers can be generated by the system. At 830, the daily, hourly, etc. time series can be analyzed by the system with respect to weekly/daily periodicity. At 840, the daily, hourly, etc. time series can be quantified based on a metric, e.g., based on the volume metric, the standardized entropy metric corresponding to the standardized entropy calculated on the probability distribution of the failures of the outgoing handovers by given EUTRAN cell neighboring cell relation, the standardized entropy metric corresponding to the standardized entropy calculated on the probability distribution of determined outgoing handover outcomes, and/or LOESS smoothing procedures.

At 910, it can be determined, by the system, whether a threshold-crossing alert has been generated, e.g., in response to a determination that the number of daily outgoing handover failures during a period of time, e.g., a day, exceeds, is above, etc. UCL (see Equation 4 above); in response to a determination that the standardized entropy of the probability distribution of outgoing handover failures by EUTRAN cell relation share is below LCL (see Equation 5 above); in response to a determination that the standardized entropy of the probability distribution of outgoing handover outcome is above UCL (see Equation 4 above).

If it is determined that the threshold crossing alert has been generated, flow continues to 920, at which performance and/or assurance metric(s) corresponding to the source eNodeB can be analyzed, e.g., by the system, which can perform root cause analysis of a handover failure anomaly associated with the source eNodeB; otherwise flow returns to 910. In another embodiment, the system can send a message to service personal, technician(s), etc., e.g., alerting the service personal, technician(s), etc. to perform the root cause analysis of anomalous cell relation(s), e.g., to analyze determined performance metrics corresponding to the source cell.

At 930, if it is determined, by the system, that the threshold crossing alert indicates that the current observed standardized entropy calculated on the probability distribution of handover failure share by relation is less than LCL (see Equation 5 above), flow continues to 1010; otherwise flow returns to 920. At 1010, a heavy hitter neighbor cell relation corresponding to the source eNodeB and a target eNodeB can be determined by the system, e.g., by employing entropy based clustering and/or non-parametric outlier detection techniques. At 1020, a daily, hourly, etc. time series corresponding to failures of incoming handovers at the target eNodeB can be created by the system.

At 1030, if it is determined, by the system, that incoming handover threshold crossing alert(s) associated with such time series corresponding to the failures of the incoming handovers correlate with outgoing handover threshold-crossing alert(s) corresponding to the source eNodeB with respect to a period of time, flow continues to 1040; otherwise flow returns to 1020.

At 1040, performance and/or assurance metric(s) corresponding to the target eNodeB can be analyzed, e.g., by the system, by service personal/technician(s) in response to the system sending a message to the service personal/technician(s), etc., e.g., for performance of root cause analysis of one or more handover failure anomalies associated with the source eNodeB and the target eNodeB.

For example, the system can determine whether all incoming handovers fail at the target eNodeB; whether all incoming handovers fail at a target EUTRAN cell during a time corresponding to an outgoing handover threshold crossing alert corresponding to the source cell, source eNodeB, source EUTRAN cell, etc.; whether all incoming handovers from a source EUTRAN cell fail; and/or whether all incoming handovers from the source EUTRAN cell to the target EUTRAN cell fail.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in non-volatile memory 1122 (see below), disk storage 1124 (see below), and/or memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory 1120 can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
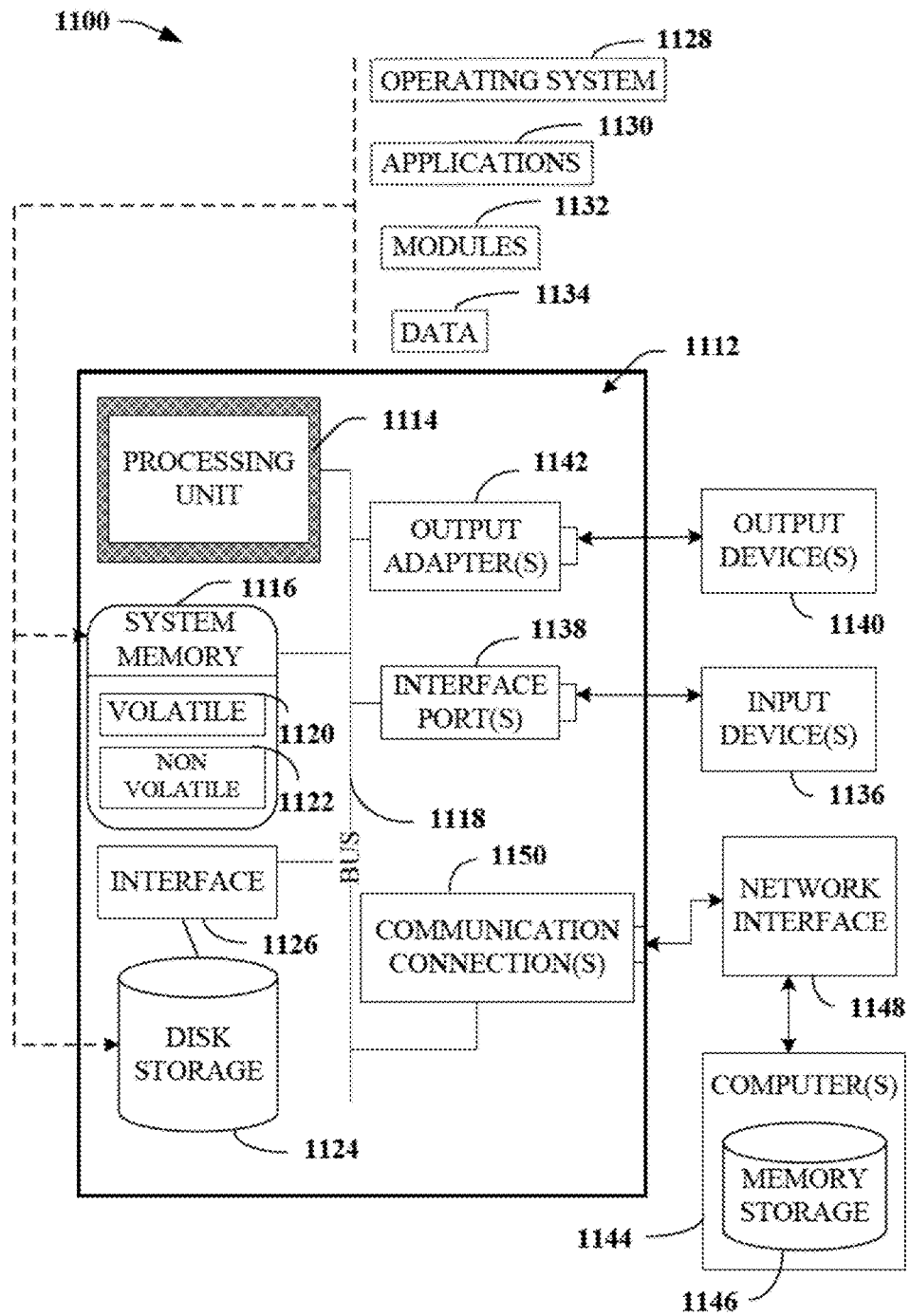
FIG. 11 is a block diagram representing an illustrative non-limiting computing system or operating environment in which one or more aspects of various embodiments described herein can be implemented.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 11, a block diagram of a computing system 1100 operable to execute the disclosed systems and methods is illustrated, in accordance with an embodiment. In other embodiments, functions, operations, etc. operable to execute the disclosed systems and methods can be implemented via a virtual computing environment. Computer 1112 includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1116 includes volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user can enter commands or information into computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1114 through system bus 1118 via interface port(s) 1138. Interface port(s) 1138 include, for example, a serial port, a parallel port, a game port, a universal serial bus (USB), a wireless based port, e.g., Wi-Fi, Bluetooth, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140, like display devices, light projection devices, monitors, speakers, and printers, among other output devices 1140, which use special adapters. Output adapters 1142 include, by way of illustration and not limitation, video and sound devices, cards, etc. that provide means of connection between output device 1140 and system bus 1118. It should be noted that other devices and/or systems of devices provide both input and output capabilities such as computer(s) 1144, e.g., network equipment, devices, etc.

Computer 1112 can operate in a networked environment using logical connections to one or more remote computers, such as computer(s) 1144. Computer(s) 1144 can be a personal computer, a server, a router, a network PC, a workstation, a microprocessor based appliance, a peer device, or other common network node and the like, and typically includes many or all of the elements described relative to computer 1112.

For purposes of brevity, only a memory storage device 1146 is illustrated with computer(s) 1144. Computer(s) 1144 is logically connected to computer 1112 through a network interface 1148 and then physically and/or wirelessly connected via communication connection 1150. Network interface 1148 encompasses wire and/or wireless communication networks such as local-area networks (LAN) and wide-area networks (WAN). LAN technologies include fiber distributed data interface (FDDI), copper distributed data interface (CDDI), Ethernet, token ring and the like. WAN technologies include, but are not limited to, point-to-point links, circuit switching networks like integrated services digital networks (ISDN) and variations thereon, packet switching networks, and digital subscriber lines (DSL). In one embodiment, network interface 1148 can serve as a line card within computer 1112, e.g., for communicating between devices of different networks, different network interfaces, etc.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, wireless modems, ISDN adapters, and Ethernet cards.

The computer 1112 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1112 can connect to other devices/networks by way of antenna, port, network interface adaptor, wireless access point, modem, and/or the like.

The computer 1112 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This includes at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a system comprising a processor, data representing a first time series of failures of outgoing handovers, wherein the outgoing handovers are outbound communication transfers from a source cell of a wireless access point device to target cells; and
   in response to determining, by the system based on a first probability distribution corresponding the outgoing handovers, that the source cell and a target cell of the target cells comprise a first anomalous relation represented by a first defined condition with respect to a defined periodic variation in the failures of the outgoing handovers within a defined period, sending, by the system, a message, directed to a device, identifying the first anomalous relation to facilitate removal of the first anomalous cell relation, from a data store, identifying the target cell as a handover candidate.

2. The method of claim 1, wherein the first probability distribution represents a volume of the failures of the outgoing handovers during a period of time.

3. The method of claim 1, wherein the first probability distribution represents the failures of the outgoing handovers by determined relations between the source cell and the target cells.

4. The method of claim 1, wherein the first probability distribution represents determined outgoing handover outcomes.

5. The method of claim 1, wherein the determining comprises:
determining, based on a logarithm associated with the first time series of the failures, a first entropy over the first probability distribution corresponding to the outgoing handovers by first determined relations between the source cell and the target cells; and
determining whether the first entropy satisfies the first defined condition.

6. The method of claim 5, further comprising:
in response to determining that the first entropy satisfies the first defined condition, determining, by the system, that the first anomalous relation is a dominant relation using entropy based clustering.

7. The method of claim 5, further comprising:
in response to determining that the first entropy satisfies the first defined condition, determining, by the system, that the first anomalous relation is a dominant relation using non-parametric outlier detection.

8. The method of claim 5, further comprising:
in response to determining that the first anomalous relation is a dominant relation, receiving, by the system, incoming handover data representing a second time series of failures of incoming handovers corresponding to the target cell, wherein the incoming handovers are incoming communication transfers from source cells comprising the source cell to the target cell; and
determining, by the system, that the target cell and a selected source cell of the source cells comprise a second anomalous relation represented by a second defined condition with respect to the incoming handovers.

9. The method of claim 8, wherein the incoming handover data represents a volume of the failures of the incoming handovers during a period of time.

10. The method of claim 8, wherein the incoming handover data represents a second entropy that has been determined on a second probability distribution of the failures of the incoming handovers by second determined relations between the target cell and the source cells.

11. The method of claim 8, wherein the incoming handover data represents a second entropy that has been determined on a second probability distribution of determined incoming handover outcomes.

12. The method of claim 8, further comprising:
in response to the determining the second anomalous relation, correlating, by the system, the first anomalous relation with the second anomalous relation.

13. A system, comprising:
a processor; and
a memory that stores executable instructions that, when executed by the processor, facilitate performance of operations, comprising:
receiving data representing a time series of failures of outgoing handovers, wherein the outgoing handovers comprise outbound communication transfers from a source cell device of the source device to target cell devices; and
in response to determining, based on a probability distribution of the outgoing handovers, that an anomalous relation comprising the source cell device and a target cell device of the target cell devices satisfies a defined condition with respect to a periodic variation of the failures of the outgoing failures, removing the anomalous relation from a data store identifying the target cell device as an outgoing handover candidate.

14. The system of claim 13, wherein the probability distribution represents a volume of the failures of the outgoing handovers during a period of time.

15. The system of claim 13, wherein the probability distribution represents the failures of the outgoing handovers by determined relations between the source cell device and the target cell devices.

16. The system of claim 13, wherein the probability distribution represents determined outgoing handover outcomes.

17. The system of claim 13, wherein the defined condition represents the failures of the outgoing handovers by determined relations between the source cell device and the target cell devices.

18. A non-transitory machine-readable storage medium, comprising executable instructions that, when executed by a processor, facilitate performance of operations, comprising:
receiving data representing a time series of failures of outgoing handovers corresponding to a source device, wherein the outgoing handovers comprise outbound communication transfers from a source cell device of the source device to target cell devices; and
in response to quantifying the time series over a probability distribution of the outgoing handovers, and in response to identifying that the source cell device and a target cell device of the target cell devices are associated with an anomalous handover failure condition with respect to a defined periodicity of the failures of the outgoing handovers within a defined period, removing the source cell device and the target cell device from a data store identifying the target cell device as a candidate for an outgoing handover.

19. The non-transitory machine-readable storage medium of claim 18, wherein the probability distribution represents the failures of the outgoing handovers by determined relations between the source cell device and the target cell devices.

20. The non-transitory machine-readable storage medium of claim 19, wherein the identifying comprises:
determining, based on a logarithm corresponding to the time series of failures, an entropy over the probability distribution of the outgoing handovers; and
in response to determining that the entropy satisfies a determined metric with respect to determined relations between the source cell device and the target cell devices, identifying that the source cell device and the target cell device comprise an anomalous relation using entropy based clustering.

* * * * *